United States Patent

[11] 3,556,392

[72] Inventor Dorothy Robin
20—56 29th St., Long Island City, N.Y. 11105
[21] Appl. No. 792,434
[22] Filed Jan. 21, 1969
[45] Patented Jan. 19, 1971

[54] COFFEE BAG
1 Claim, 5 Drawing Figs.
[52] U.S. Cl. ........................................ 229/69,
99/77.1, 150/11, 206/0.5, 206/56, 229/63
[51] Int. Cl. .................................... B65d 27/10,
B65d 33/12, B65d 85/70
[50] Field of Search .......................... 206/0.5,
56(A3); 150/11; 229/53, 55, 63, 62, 60, 69;
99/77.1

[56] References Cited
UNITED STATES PATENTS

| | | | |
|---|---|---|---|
| 1,947,523 | 2/1934 | Hirschhorn .................. | 229/53 |
| 2,092,969 | 9/1937 | Gustafson et al. ............ | 229/55 |
| 2,409,314 | 10/1946 | Rambold ..................... | 229/53 |
| 2,863,365 | 12/1958 | Piazze ........................ | 150/11 |
| 3,053,665 | 9/1962 | Irmscher ..................... | 206/0.5 |
| 3,079,966 | 3/1963 | Kugler ........................ | 150/11 |

*Primary Examiner*—William T. Dixson, Jr.

ABSTRACT: This invention relates to a bag formed of paper and containing granular coffee for steeping in boiling water for making individual or small servings of coffee.

PATENTED JAN 19 1971 3,556,392
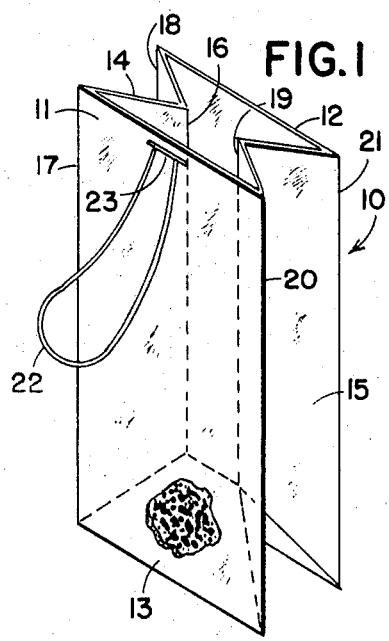
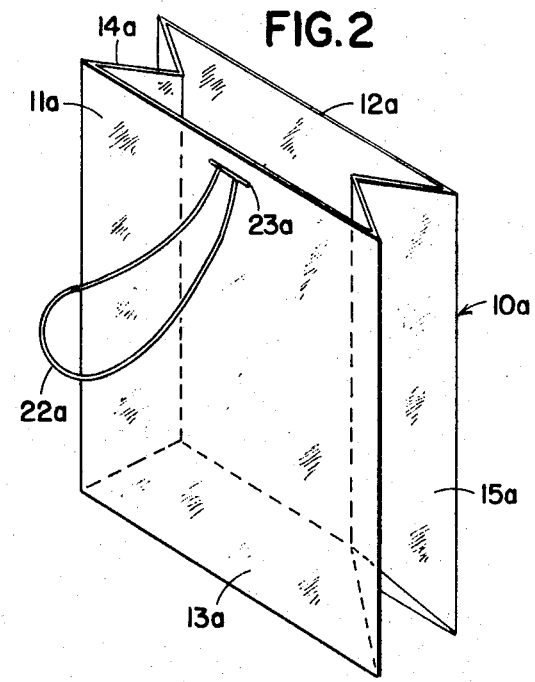
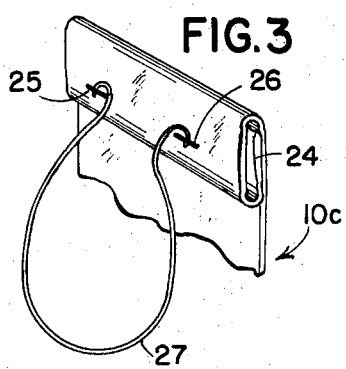
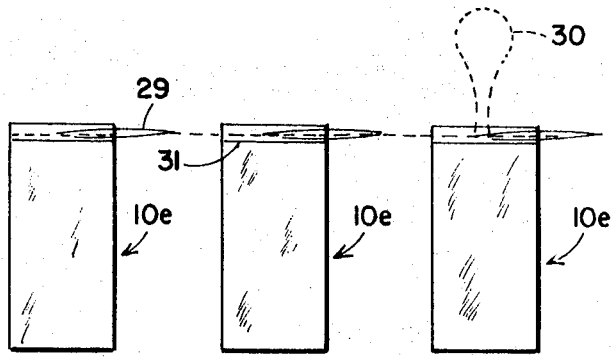
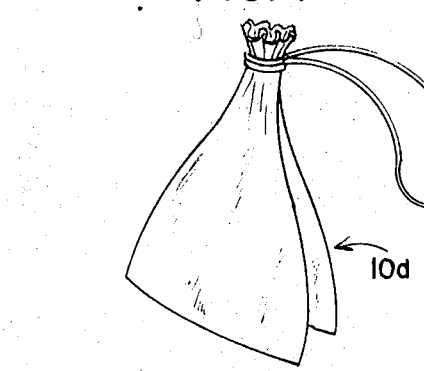
INVENTOR.
Dorothy Robin 3,556,392

COFFEE BAG

BACKGROUND OF THE INVENTION

The device commonly known as a tea bag has been in common use for the brewing of individual cups of tea. However, in the past, attempts to provide a similar device for the brewing of coffee has been relatively unsuccessful. Brewing of coffee with these coffee bags either has required such an excessive time as to make the device impractical, or has resulted in escape of the coffee grounds into the liquid, thus making an unpalatable and undesirable beverage. Such bags are commonly made of cotton and other fibrous materials usually woven, and it has been found that diminution of the size of the mesh openings in the bag to the point where the undesirable coffee grounds within the bag will not escape into the surrounding hot water will so increase the brewing time of the beverage that the device becomes impractical.

SUMMARY OF THE INVENTION

A bag used in brewing individual or small servings of coffee is made of paper having sufficient strength to withstand normal wetting with boiling water but which is permeable to the ingredients of the coffee which are released when the bag is immersed in hot water. The bag has pleats along the sides thereof, extending substantially from one end to the other, whereby a greater volume of coffee may be contained within the bag and a greater surface area incorporated in the bag with the same longitudinal and width dimension. A string is affixed to the bag to facilitate handling when it is immersed in and removed from a container of hot water.

DESCRIPTION OF THE DRAWINGS

FIG. 1 is a perspective view of a coffee bag for making one cup of coffee constructed according to one embodiment of the invention.

FIG. 2 is a perspective view of a coffee bag, similar to FIG. 1, but of a two cup size.

FIG. 3 is a partial perspective view of a coffee bag folded over on the top in a double fold.

FIG. 4 is a perspective view of a coffee bag closed at the neck by a loop string.

FIG. 5 is a side elevation of a plurality of coffee bags with the ends closed by continuous stitching extending from bag to bag.

DESCRIPTION OF THE PREFERRED EMBODIMENTS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed is for the purpose of description and not of limitation.

As illustrated in FIG. 1, the coffee brewing bag generally designated 10 comprises a front panel 11, a rear panel 12, a bottom 13 and two pleated sides 14 and 15. The pleated side 14 has a central fold line 16 and is joined to the front and rear panels 11 and 12 along the lines 17 and 18 respectfully. The pleated side 15 also has a central fold line 19 and is joined to the front and rear panels 11 and 12 along the lines 20 and 21 respectively. A string 22 formed as a loop may be stapled to the front panel 11 by the staple 23 to facilitate handling of the bag when it is immersed and removed from a container of boiling water. Alternatively, the string 22 may be included in a hem formed around the top of the bag 10 so that the string may be pulled to draw in the top of the bag to close it.

FIG. 2 is similar to FIG. 1 except that the coffee bag in FIG. 2 is adapted to hold sufficient coffee to brew two or three cups of coffee whereas the bag in FIG. 1 is of a size sufficient for brewing one cup. The same numerals identify similar parts in FIGS. 1 and 2 except in FIG. 2, the numerals have a suffix $a$.

FIG. 3 shows an alternate manner of closing off the top of the bag 10c wherein the upper part of the bag 10c including the upper part of the front and rear panels and the pleated sides, are folded over to form a flat double fold 24. Staples 25 and 26 may be employed to secure the fold 24 and to affix the ends of a string 27.

In an alternate arrangement shown in FIG. 4, a draw string 28 is employed to close the top of the bag 10d.

FIG. 5 shows an arrangement wherein continuous stitching 29 extends across the top of each bag 10c and between each of a plurality of adjacent bags. When the stitching 29 between each bag 10e is cut, the stitching remaining on each bag may be drawn or pulled into a loop 30 as shown in broken lines in FIG. 5.

Thus, a continuous line of bags may be produced in this manner. The tops of the bags 10e in FIG. 5 may be rolled over and folded as indicated at 31 before the stitching 29 is applied.

The bags are made of paper commonly used in filtering coffee, for example the type of paper used in filtering "Bunn" percolator coffee. This paper does not break or come apart when immersed in boiling water. The pleats in the bag allow for the expansion of wet coffee but when pressed together before use during storage, permits the bag to lay flat and occupy a minimum of space.

With the coffee bags of the present invention, the user may enjoy fresh ground coffee which can be prepared in a minimum amount of time and with a minimum effort. It eliminates having to throw away messy, spent coffee and having to clean a coffee pot with its components. The coffee can be made in a plain or regular sauce pan or glass utensil which is more sanitary than the common coffee pot with its hard to clean spout. Also the individual bags retain the flavor and aroma longer because they are individually sealed. Of course, the housewife may also buy empty bags and put the coffee in herself.

The coffee bags of this invention may be placed in a pot of boiling water and boiled or each bag may be placed in an individual cup or pot with hot water poured over it to let it steep.

It is thought that the invention and many of its attendant advantages will be understood from the foregoing description and it will be apparent that various changes may be made in the form, construction and arrangement of the parts of the article without departing from the spirit and scope of the invention or sacrificing all of its material advantages, the form hereinbefore described being merely a preferred embodiment thereof.

I claim:

1. An article for use in brewing coffee comprising a bag made of paper having sufficient strength to withstand normal wetting with boiling water but which is permeable to the ingredients of coffee which are released when the bag is immersed in hot water, said bag having pleats along the sides thereof extending substantially from one end of the bag to the other, whereby a greater volume of coffee may be contained within the bag and a greater surface area incorporated in the bag with the same longitudinal and width dimension, a string or the like affixed to said bag for handling the latter as it is immersed in a container of hot water, said bag being initially open at the top to permit the user to place coffee therein prior to brewing the coffee in said bag, continuous stitching extending across the top of a plurality of bags of the type heretofore described and between such individual bags, said stitching between the bags being adapted to be cut so that the stitching on each bag can be drawn to close the bag and form a loop.